United States Patent
Bansal et al.

(10) Patent No.: US 9,316,757 B2
(45) Date of Patent: Apr. 19, 2016

(54) REMOVAL OF FRACTURE-INDUCED ANISOTROPY FROM CONVERTED-WAVE SEISMIC AMPLITUDES

(71) Applicants: Reeshidev Bansal, Spring, TX (US); Michael P. Matheney, The Woodlands, TX (US)

(72) Inventors: Reeshidev Bansal, Spring, TX (US); Michael P. Matheney, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 56 days.

(21) Appl. No.: 14/353,745

(22) PCT Filed: Oct. 9, 2012

(86) PCT No.: PCT/US2012/059376
§ 371 (c)(1),
(2) Date: Apr. 23, 2014

(87) PCT Pub. No.: WO2013/085616
PCT Pub. Date: Jun. 13, 2013

(65) Prior Publication Data
US 2014/0262250 A1   Sep. 18, 2014

Related U.S. Application Data

(60) Provisional application No. 61/567,516, filed on Dec. 6, 2011.

(51) Int. Cl.
*E21B 49/00* (2006.01)
*G01V 1/30* (2006.01)
*G01V 1/36* (2006.01)

(52) U.S. Cl.
CPC . *G01V 1/30* (2013.01); *E21B 49/00* (2013.01); *G01V 1/303* (2013.01); *G01V 1/362* (2013.01); *G01V 2210/6222* (2013.01); *G01V 2210/6226* (2013.01); *G01V 2210/646* (2013.01)

(58) Field of Classification Search
CPC ..... G01V 1/30; G01V 2210/626; G01V 1/28; G01V 1/282; G01V 2210/646; E21B 49/00; E21B 47/02; E21B 47/022
See application file for complete search history.

(56) References Cited

U.S. PATENT DOCUMENTS

| | | | |
|---|---|---|---|
| 5,343,441 A | 8/1994 | Alford | |
| 5,610,875 A | 3/1997 | Gaiser | |
| 5,835,452 A | 11/1998 | Mueller et al. | |
| 5,999,486 A | 12/1999 | DeVault | |
| 6,101,448 A | 8/2000 | Ikelle et al. | |

(Continued)

OTHER PUBLICATIONS

Aki, K. et al. (2002), "*Quantitative Seismology: Theory and Methods,*" v. 1, W. H. Freeman and Co., p. 148.

(Continued)

*Primary Examiner* — Zakiya W Bates
(74) *Attorney, Agent, or Firm* — ExxonMobil Upstream Research Company, Law Dept.

(57) ABSTRACT

The present disclosure provides a system and method for inferring one or more physical property parameters of a subsurface media by inverting converted wave data acquired during a seismic survey. Composite seismic traces are generated at a plurality of survey azimuths (step 609). These composite traces are composed such that their amplitudes are free of effects of subsurface anisotropy. At least one of the generated composite seismic traces is then inverted by isotropic inversion to determine a property parameter of the subsurface media (step 623).

16 Claims, 7 Drawing Sheets

(56) References Cited

U.S. PATENT DOCUMENTS

| | | | |
|---|---|---|---|
| 6,128,580 | A | 10/2000 | Thomsen |
| 6,212,477 | B1 | 4/2001 | Zhu et al. |
| 6,470,274 | B1 | 10/2002 | Mollison et al. |
| 6,473,696 | B1 | 10/2002 | Onyia et al. |
| 6,493,632 | B1 | 12/2002 | Mollison et al. |
| 6,529,833 | B2 | 3/2003 | Fanini et al. |
| 6,611,764 | B2 | 8/2003 | Zhang |
| 6,640,190 | B2 | 10/2003 | Nickel |
| 6,643,589 | B2 | 11/2003 | Zhang et al. |
| 6,711,502 | B2 | 3/2004 | Mollison et al. |
| 6,751,558 | B2 | 6/2004 | Huffman et al. |
| 6,760,667 | B1 | 7/2004 | Kelly et al. |
| 6,785,612 | B1 | 8/2004 | Zhang |
| 6,820,010 | B1 | 11/2004 | Sahai et al. |
| 6,871,146 | B1 | 3/2005 | Kelly et al. |
| 6,885,947 | B2 | 4/2005 | Xiao et al. |
| 6,904,368 | B2 | 6/2005 | Reshef et al. |
| 6,917,564 | B2 | 7/2005 | Leaney |
| 6,977,866 | B2 | 12/2005 | Huffman et al. |
| 7,082,368 | B2 | 7/2006 | Nickel |
| 7,162,463 | B1 | 1/2007 | Wentland |
| 7,184,991 | B1 | 2/2007 | Wentland |
| 7,188,092 | B2 | 3/2007 | Wentland et al. |
| 7,236,886 | B2 | 6/2007 | Frenkel |
| 7,295,706 | B2 | 11/2007 | Wentland et al. |
| 7,308,139 | B2 | 12/2007 | Wentland et al. |
| 7,355,923 | B2 | 4/2008 | Reshef et al. |
| 7,421,346 | B2 | 9/2008 | Goujon et al. |
| 7,523,003 | B2 | 4/2009 | Robertsson et al. |
| 7,844,612 | B2 | 11/2010 | Colgrave et al. |
| 7,894,298 | B2 | 2/2011 | Manen et al. |
| 2006/0184488 | A1 | 8/2006 | Wentland |
| 2007/0145980 | A1 | 6/2007 | Conti et al. |
| 2008/0175478 | A1 | 7/2008 | Wentland et al. |
| 2008/0225641 | A1 | 9/2008 | Van Manen et al. |
| 2010/0004870 | A1 | 1/2010 | Tonellot et al. |
| 2010/0177595 | A1 | 7/2010 | Khare et al. |
| 2011/0182144 | A1 | 7/2011 | Gray |
| 2011/0222370 | A1 | 9/2011 | Downton et al. |

OTHER PUBLICATIONS

Dewangan, P. et al. (2006), "Modeling and Inversion of PS-wave moveout asymmetry for tilted TI media: Part I—Horizontal TTI layer," *Geophysics* 71(4), pp. D107-D121.

Gaiser, J.E. (1999), "Application for vector coordinate systems of 3-D converted-wave data," *The Leading Edge* 18, pp. 1290-1300.

Jilek, P. (2001), "Modeling and inversion of converted-wave reflection coefficients in anisotropic media: A tool of quantitative AVO analysis," PhD dissertation, Colorado School of Mines, pp. 1-74.

Jilek, P. (2001), "Modeling and inversion of converted-wave reflection coefficients in anisotropic media: A tool of quantitative AVO analysis," PhD dissertation, Colorado School of Mines, pp. 75-184.

Khare, V. et al. (2009), "Registration of PP and PS data using joint AVA attributes," $71^{st}$ EAGE Conf., 5 pgs.

Ruger, A. et al. (1997), "Using AVO for fracture detection: Analytic basis and practical solutions," *The Leading Edge* 16, pp. 1429-1434.

Sarka, D. et al. (2003), "Anisotropic inversion of seismic data for stressed media: Theory and a physical modeling study on Berea Sandstone," *Geophysics* 68(2), pp. 690-704.

Thomsen, L. (1986), "Weak elastic anisotropy," *Geophysics* 51(10), pp. 1954-1966.

Tsvankin, I. (1997), "Reflection moveout and parameter estimation for horizontal transverse anisotropy," *Geophysics* 62, pp. 614-629.

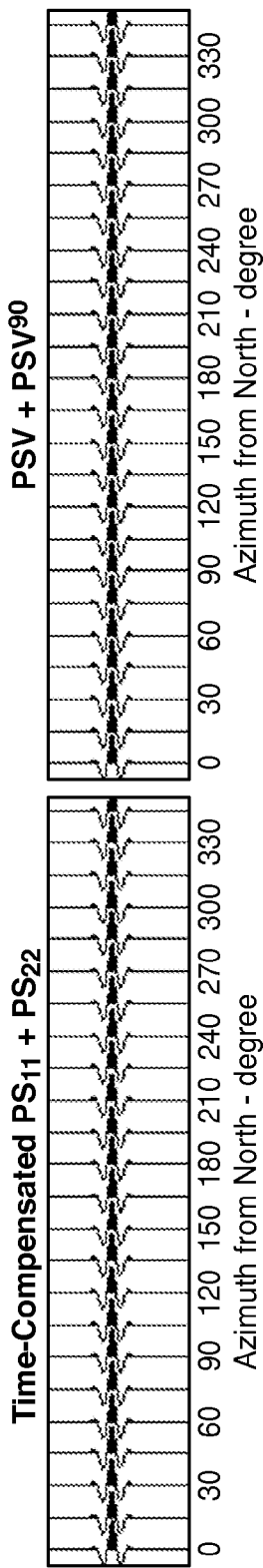
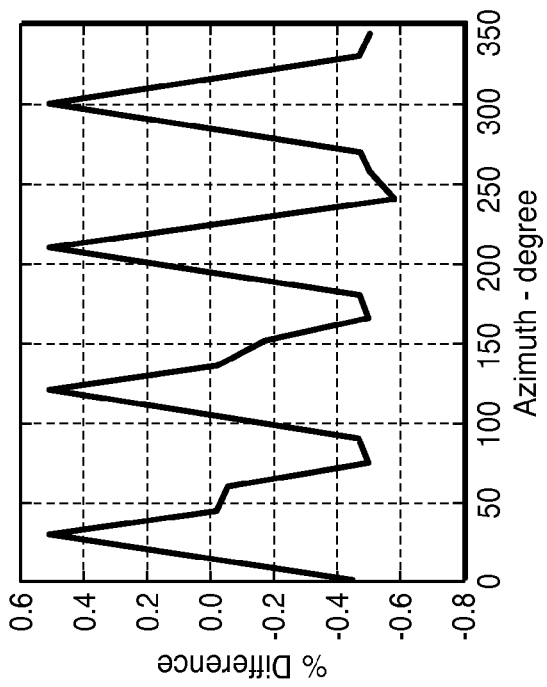
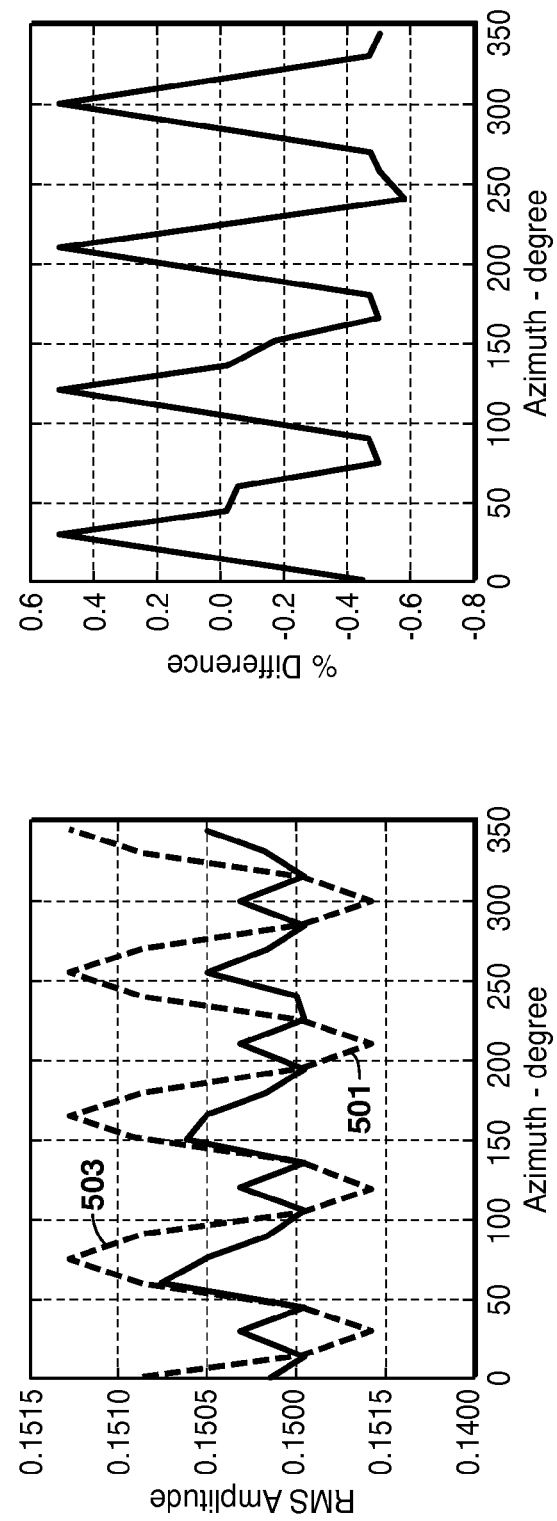
FIG. 4
FIG. 5A
FIG. 5B

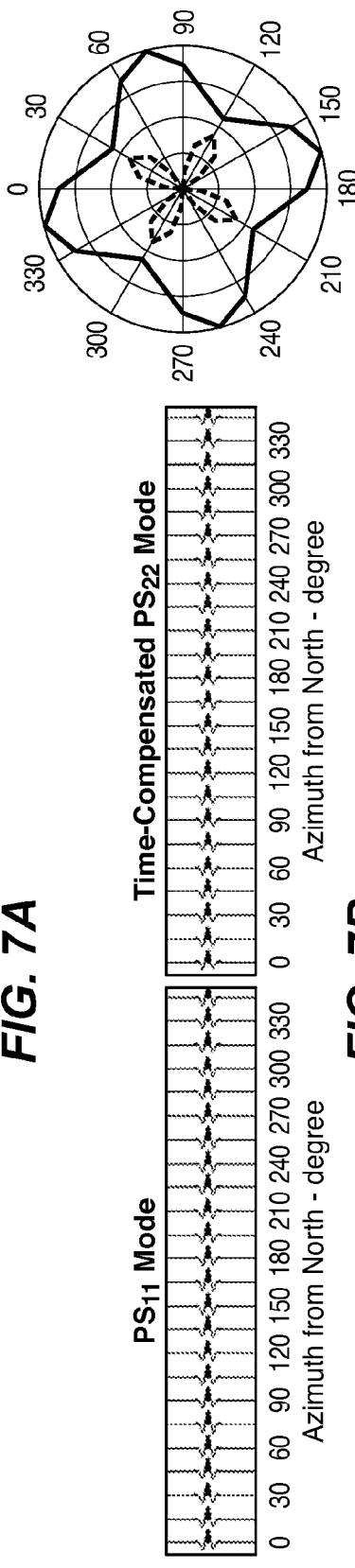
FIG. 7A
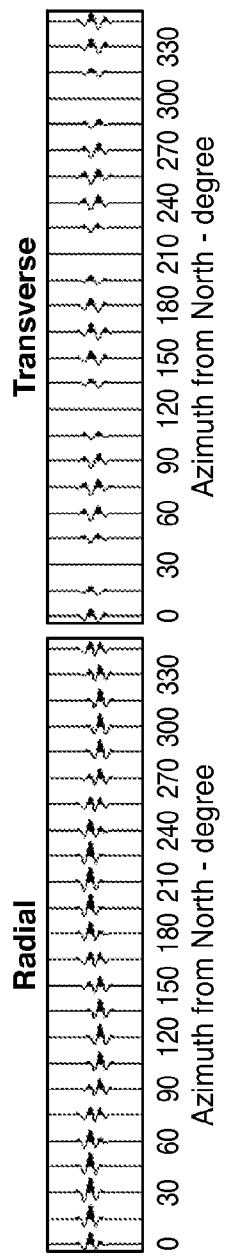
FIG. 7B
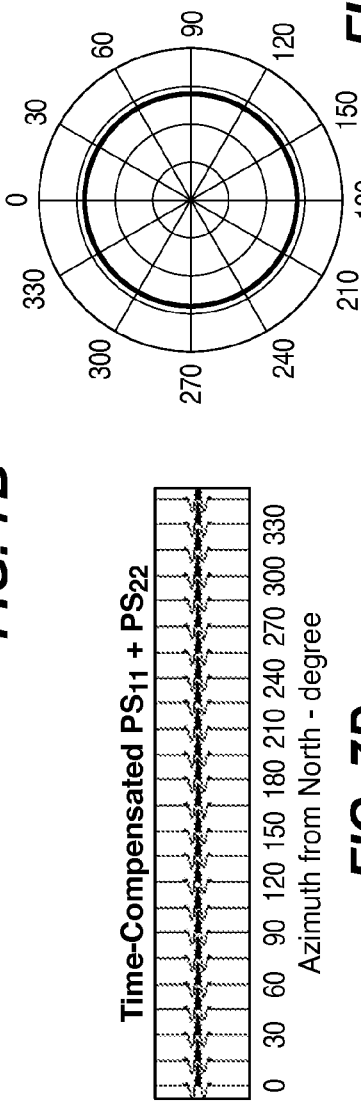
FIG. 7C
FIG. 7D
FIG. 7E

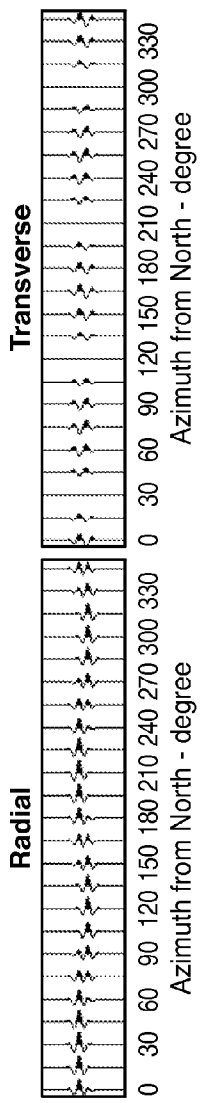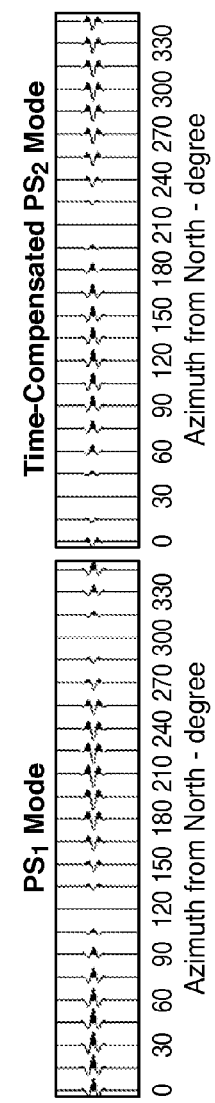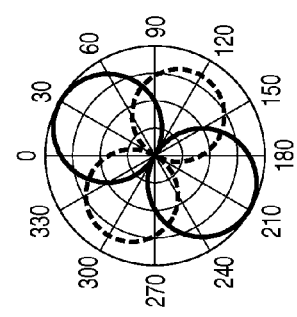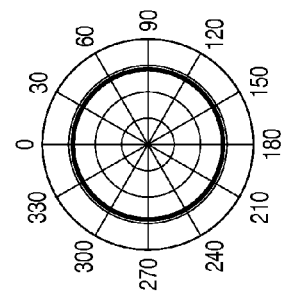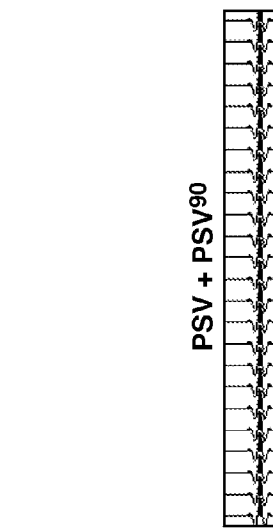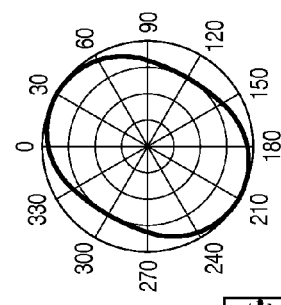
FIG. 8A FIG. 8B FIG. 8C FIG. 8D FIG. 8E FIG. 8F FIG. 8G

REMOVAL OF FRACTURE-INDUCED ANISOTROPY FROM CONVERTED-WAVE SEISMIC AMPLITUDES

CROSS-REFERENCE TO RELATED APPLICATION

This application is the National Stage of International Application No. PCT/US2012/059376, that published as WO 2013/085616, filed 9 Oct. 12, 2012, which claims the benefit of U.S. Provisional Application No. 61/567,516, filed Dec. 6, 2011, entitled REMOVAL OF FRACTURE INDUCED ANISOTROPY FROM CONVERTED-WAVE SEISMIC AMPLITUDES, each of which is incorporated herein by reference, in its entirety, for all purposes.

FIELD OF INVENTION

This invention generally relates to the field of seismic prospecting and reservoir delineation and, more particularly, to subsurface rock property prediction in a fractured media using geophysical seismic data. More specifically, the invention provides a system and method to remove the effects of fracture-induced anisotropy on the seismic amplitude of converted-wave data seismic data thereby allowing the data to be inverted for at least one subsurface rock property using traditional seismic inversion schemes.

BACKGROUND

It is well know that seismic reflection amplitudes vary with the incidence angle or the acquisition offset. This variation in the seismic amplitude is governed by subsurface rock properties, such as P-wave velocity or impedance, S-wave velocity or impedance, and density. It is a fairly common practice in the geophysics community to predict or invert for these subsurface properties by exploiting this property of the seismic reflection amplitudes. Such inversion methodologies are conventionally referred to as Amplitude-vs-Angle (AVA) or Amplitude-vs-Offset (AVO) inversion. The most common types of reflection modes used in the geophysics community are PP and PS modes. A reflected PP mode is excited when both the incident and the reflected waves are P-wave, whereas a PS mode is defined by an incident P-wave but a reflected S-wave.

Reflectivity at the interface between two elastic media can be calculated by Zoeppritz's equations. However, Zoeppritz's equations are complex and, in their original form, do not provide any insight to the physics of the wave propagation. Due to their nonlinear form, they are difficult to use in linear inverse problems and may cause nonuniqueness in the inversion solutions. Hence, a number of its linearized forms have been proposed in the last thirty years for both isotropic and anisotropic media. Aki and Richard [1] derived linearized forms of reflectivity between two isotropic media for all possible modes of wave propagation. Their equations have been further simplified by several authors and have served as a basis for most of the AVA-based inversion.

As known by those of ordinary skill in the art, if the medium is isotropic or has polar anisotropy, the seismic reflection amplitudes vary only with the incidence angle. However, if the medium is azimuthally anisotropic, the seismic amplitudes vary both with the incidence angle and the azimuth of the incidence plane. It is well known that at seismic wavelengths, fractured reservoirs exhibit azimuthal anisotropy. More specifically, one set of parallel vertical fractures in isotropic rocks causes HTI anisotropy. Ruger and Tsvankin [2] proposed a seismic inversion method for HTI media. Their method, however, is limited to PP data only. They derived new linearized equations for the reflection coefficients for HTI media and they showed that the reflectivity between two HTI media is governed by the additional anisotropic or Thomsen's parameter [3] along with P-wave velocity and density.

S-waves while travelling through fractured rocks split into the fast ($S_1$) and slow ($S_2$) S-waves. This phenomenon, along with the anisotropic nature of reflection coefficients, compounds the problem of seismic inversion of PS modes. Due to azimuthally varying elastic properties in HTI media, seismic reflectivity also varies with azimuth of wave propagation. The extra anisotropic constants in HTI media and complex wave propagation render the equations for reflection coefficients very complex and cause the AVA-based inverse problem to be intractable. Due to these problems, inversion for PS data in azimuthally anisotropic media is not very popular.

Jilek [4] proposed a method to invert for isotropic and anisotropic subsurface parameters in azimuthally anisotropic media. His method simultaneously inverts for both isotropic and anisotropic parameters, which render his approach unstable and unsuitable for application on field data which usually have low signal-to-noise ratio.

Thus, there is a need for improvement in this field.

SUMMARY OF THE INVENTION

The present invention provides a system and method for removal of fracture-induced anisotropy from converted wave seismic amplitudes.

In one embodiment, the invention is a method for inferring one or more physical property parameters of a subsurface media by inverting converted wave data acquired during a seismic survey, the method comprising: generating a composite seismic trace at a plurality of survey azimuths, said composite traces being composed such that their amplitudes are free of effects of subsurface anisotropy; and inverting at least one composite seismic trace by isotropic inversion to determine a property parameter of a subsurface media.

BRIEF DESCRIPTION OF THE DRAWINGS

The present invention and its advantages will be better understood by referring to the following detailed description and the attached drawings.

FIGS. 1A and 1C depict reflection coefficients PSV and PSH, respectively, at an incidence angle of 25°. FIGS. 1B and 1D depict reflection coefficients PSV and PSH, respectively, at an azimuth of 20°.

FIGS. 3A and 3B depict the anisotropic approximation (solid line) and the isotropic approximation (dashed line) for dry cracks in sand at various incidence angles and azimuths, respectively. FIGS. 3C and 3D depict the anisotropic approximation (solid line) and the isotropic approximation (dashed line) for fully-saturated cracks in sand at various incidence angles and azimuths, respectively.

FIG. 4 shows a synthetic example comparing left and right side of Equation 15.

FIG. 5A illustrates a comparison between RMS amplitudes from the $PS_{11}+PS_{22}$ (solid) gathers and the summed orthogonal PSV gathers (dashed). FIG. 5B charts the percentage difference between the two gathers at every azimuth.

FIGS. 7A-7E demonstrate composite trace generation according to one embodiment the present disclosure. Synthetic radial and transverse traces are depicted in FIG. 7A. FIG. 7B depicts $PS_{11}$ and $PS_{22}$ traces generated using the 4C rotation process. Summed $PS_{11}$ and $PS_{22}$ traces are illustrated in FIG. 7D. In polar plot form, the seismic amplitudes of the $PS_{11}$ and $PS_{22}$ traces (FIG. 7C) and the generated anisotropy-free composite traces (FIG. 7E) are depicted.

FIGS. 8A-8G demonstrate composite trace generation according to another embodiment to the present disclosure. Synthetic radial and transverse traces are depicted in FIG. 8A. FIG. 8B depicts $PS_1$ and $PS_2$ traces generated using the 2C rotation process. Generated PSV traces are illustrated in FIG. 8D. $PSV+PSV^{90}$ traces are illustrated in FIG. 8F. In polar plot form, the seismic amplitudes of the $PS_1$ and $PS_2$ traces (FIG. 8C), the PSV traces (FIG. 8E), and the generated anisotropy-free composite traces (FIG. 8G) are depicted.

Figure 1A:
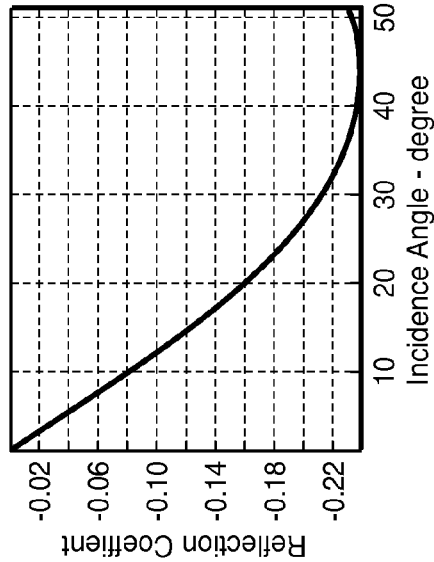
FIGS. 1A-1D depict the reflection coefficients of PSV and PSH modes at a shale/fractured sand boundary.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, it must be performed on a computer, typically a suitably programmed digital computer.

DESCRIPTION OF THE SELECTED EMBODIMENTS

As noted above, Jilek [4] discloses a variant of the linearized form of reflectivity in anisotropic media for converted waves (PS mode). However, his equations are very complex and it is difficult for them to be used to set up a working inverse problem. The present disclosure provides an alternate form of the PS reflection coefficients between two HTI media and demonstrates how the reflection coefficients may be utilized.

The linearized form of reflection coefficients between two HTI media for PSV and PSH modes, which are the vertical and horizontal components of the reflected PS mode, can be written as follows:

$$R_{PSV}^{HTI}(\theta,\phi) = (D_{PSV}^{ISO,S} + D_{PSV}^{ANISO,S})\sin\theta + (E_{PSV}^{ISO,S} + E_{PSV}^{ANISO,S})\sin^3\theta \quad (1)$$

and $$R_{PSH}^{HTI}(\theta,\phi) = D_{PSH}^{ANISO}\sin\theta + E_{PSH}^{ANISO}\sin^3\theta, \quad (2)$$

where $\theta$ is the incidence angle of the slowness vector. It is important to note that $R_{PSV}^{HTI}$ is controlled by both isotropic and anisotropic terms, whereas $R_{PSH}^{HTI}$ is controlled by anisotropic terms only. In deriving the above equations, it was assumed that the contrasts between the two surfaces are small. It was also assumed that the azimuth of the fracture normal is same in both media. Barring anisotropic terms, equation 1 is very similar to the PS reflection coefficient given by Khare et al. [5].

As will be demonstrated below, the anisotropic terms are dependent on anisotropic constants and the azimuth $\phi$ of the incidence plane with respect to the fracture normal. In the given form, it is assumed that the fracture normal is pointing in the x-direction. By using a perturbation approach, the following expressions can be derived:

$$D_{PSV}^{ISO,S} = -\frac{2}{g}\frac{\Delta\beta^S}{\beta^S} - \frac{g+2}{2g}\frac{\Delta\rho}{\rho} \quad (3)$$
$$= -\frac{2}{g}\frac{\Delta I_s^S}{I_s^S} - \frac{g-2}{2g}\frac{\Delta\rho}{\rho},$$

$$E_{PSV}^{ISO,S} = \frac{g+2}{g^2}\frac{\Delta\beta^S}{\beta^S} + \frac{2g+3}{4g^2}\frac{\Delta\rho}{\rho} \quad (4)$$
$$= \frac{g+2}{g^2}\frac{\Delta I_s^S}{I_s^S} - \frac{2g+5}{4g^2}\frac{\Delta\rho}{\rho}.$$

In $D_{PSV}^{ISO,S}$ and $E_{PSV}^{ISO,S}$, S signifies slow S-wave based attributes, $\beta^S$, $I_s^S$ and $\rho$ are averages of the slow S-wave velocities, slow S-wave impedances and densities of the surfaces. $\Delta\beta^S$, $\Delta I_s^S$ and $\rho$ are the differences of slow S-wave velocities, slow S-wave impedances and densities between the surfaces. g is the ratio of the average P- and S-wave velocities. The anisotropic components of $R_{PSV}^{HTI}$ can be written as follows:

$$D_{PSV}^{ANISO,S} = \frac{g\cos^2\phi}{2(g+1)}\Delta\delta^{(v)} - \frac{2\sin^2\phi}{g}\Delta\gamma \quad (5)$$

and $$E_{PSV}^{ANISO,S} = \quad (6)$$
$$\frac{\cos^2\phi}{4(g+1)}(1-4g\cos^2\phi)\Delta\delta^{(v)} + \frac{g\cos^4\phi}{g+1}\Delta\varepsilon^{(v)} + \frac{(g+2)\sin^2\phi}{g^2}\Delta\gamma,$$

where $\delta^{(v)}$ and $\epsilon^{(v)}$ are Tsvankin's Thomsen-style anisotropic parameters for HTI media [6]. $\gamma$ is the generic Thomsen's parameter [3]. Similarly, we can write the following expressions for PSH mode:

$$D_{PSH}^{ANISO} = \frac{g\sin 2\phi}{4(g+1)}\Delta\delta^{(v)} + \frac{\sin 2\phi}{g}\Delta\gamma \quad (7)$$

and $$E_{PSH}^{ANISO} = \quad (8)$$
$$\sin 2\phi\left[\frac{1}{8g} - \frac{g\cos^2\phi}{2(g+1)}\right]\Delta\delta^{(v)} + \frac{g\sin 2\phi\cos^2\phi}{2(g+1)}\Delta\varepsilon^{(v)} + \frac{(1-g^2)\sin 2\phi}{g^3}\Delta\gamma$$

Figure 1B:
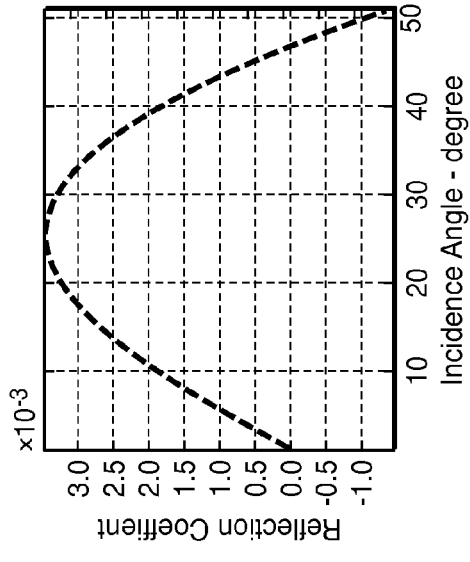
Figure 1C:
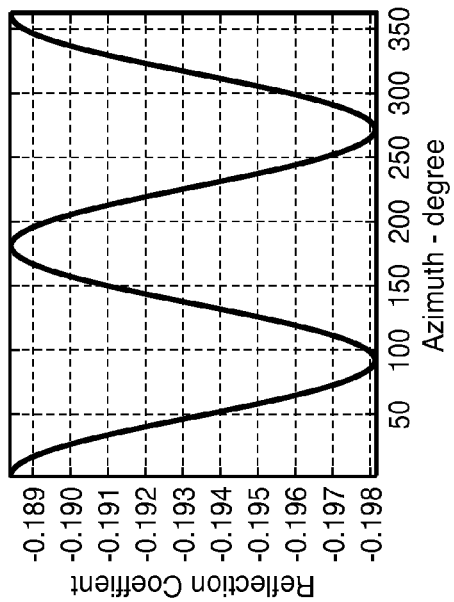
Figure 1D:
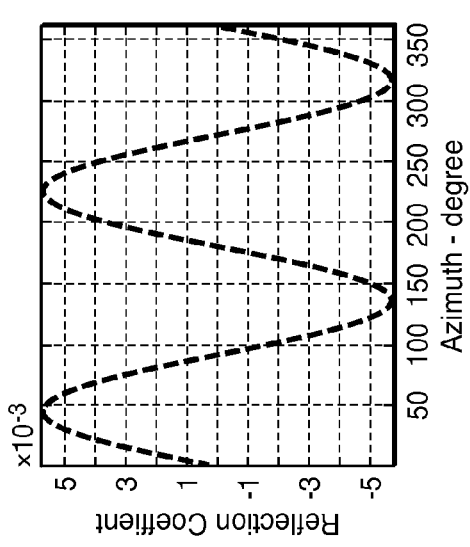

FIGS. 1A-D depict the reflection coefficients of PSV and PSH modes at a shale/fractured sand boundary. FIGS. 1A and 1C depict reflection coefficients PSV and PSH, respectively, at an incidence angle of 25°. FIGS. 1B and 1D depict reflection coefficients PSV and PSH, respectively, at an azimuth of 20°. The following parameters were used to characterize the media. Medium 1 (shale): Vp1=3500 ms; Vs1=1800 ms; ρ1=1.8 g/cc; crack density e1=0.01; dry cracks. Medium 2 (sand): Vp1=4000 ms; Vs1=2500 ms; ρ1=2.3 g/cc; crack density e1=0.06; dry cracks. As shown, the PSH reflection coefficients are much smaller than the PSV reflection coefficients.

Unlike isotropic media, where an incident P-wave on a flat reflector can only generate a converted PSV mode, both PSV and PSH modes can be generated in HTI media. If the incidence medium is isotropic and the reflecting medium is HTI, no S-wave splitting occurs and both PSV and PSH modes are recorded concurrently at the receiver. If the incident medium is HTI, S-wave splitting occurs and the reflected S-wave travels as fast (PS$_1$) and slow (PS$_2$) modes and a time-lag is introduced between both modes.

Bansal et al. [7], which is incorporated by reference in its entirety, presented a method to generate PS$_1$ and PS$_2$ modes from radial and transverse PS data. This process can be referred to as 2-component rotation, or 2C rotation. Bansal et al. [7] also taught how to remove the time-lag in the PS$_2$ mode in order to align it to the PS$_1$ mode. The time-aligned PS$_2$ mode may also be referred to as the time-compensated PS$_2$ mode. In other embodiments, the PS$_1$ mode may be shifted to align with the PS$_2$ mode. In either case, the resulting PS$_1$ and PS$_2$ mode data has been time-adjusted.

It can be shown that PSV and PSH modes can be derived from PS$_1$ and time-compensated PS$_2$ data as follows:

$$\begin{bmatrix} PSV \\ PSH \end{bmatrix} = \begin{bmatrix} \sin\phi & \cos\phi \\ -\cos\phi & \sin\phi \end{bmatrix} \begin{bmatrix} PS_1 \\ PS_2 \end{bmatrix} \quad (9)$$

where $\phi$ is the azimuth of the survey with respect to the fractures normal (symmetry axis). Equation 9 is strictly valid only for vertical propagation. However, in weakly anisotropic medium, where Vp/Vs is reasonably large, it remains valid for most practical purposes.

Figure 2A:
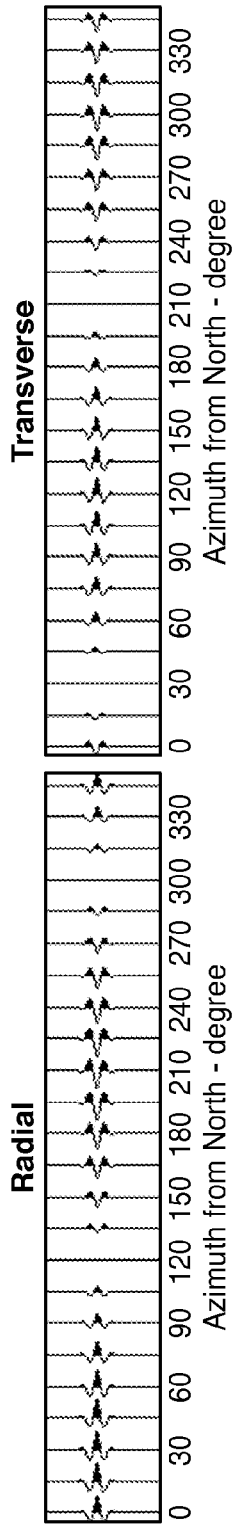
FIGS. 2A-2C depict an example of $PS_1/PS_2$ conversion to PSV/PSH.
Figure 2B:
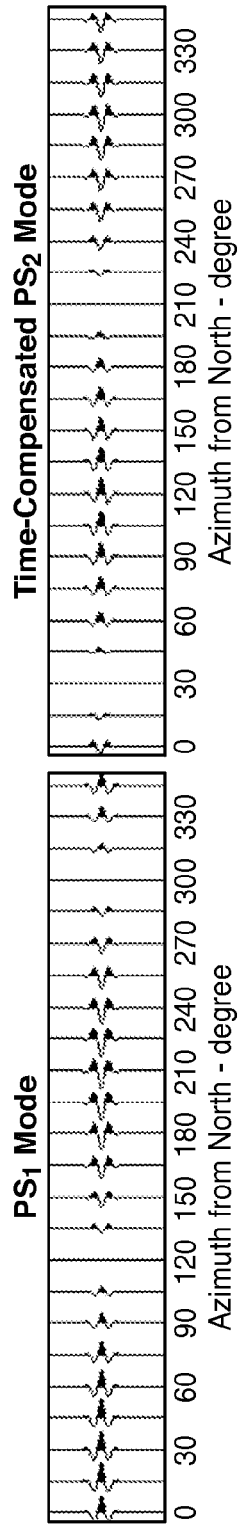
Figure 2C:
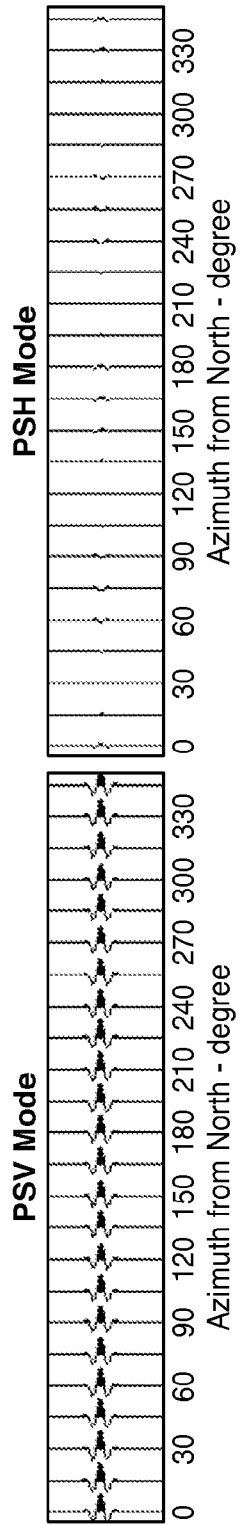

FIGS. 2A-2C depict an example of PS$_1$/PS$_2$ conversion to PSV/PSH using equation 9. In this example, the incident medium is HTI with the fracture normal pointing to 120° from north. The synthetic data depicted in FIG. 2A is resolved into radial (direction along the line connecting source to receiver) and transverse (direction perpendicular to the line connecting source to receiver) components. Those radial and transverse components are then rotated to PS$_1$ and PS$_2$ modes using the method described in Bansal et al. [7]. A time-shift is applied to the PS$_2$ mode in order to compensate for the delay in the S$_2$ data. The PS$_1$ and time-compensated PS$_2$ data is depicted in FIG. 2B. Next, the PSV and PSH modes are generated using equation 9. These modes are depicted in FIG. 2C.

As shown in FIG. 2C, most of the reflected converted-wave energy is present in PSV mode. This observation is consistent with the PSV and PSH reflection coefficient data shown in FIGS. 1A-D. Therefore, the PSV and PSH modes can be thought of as re-computed radial and transverse components if no time-lag existed between PS$_1$ and PS$_2$ modes. Said differently, if there were no time-lag between PS$_1$ and PS$_2$ modes, field-recorded radial and transverse components would be equivalent to PSV and PSH modes.

But as shown in FIGS. 1A-D, the reflection amplitude of PSV varies both with the incidence angle and azimuth. Furthermore, the PSV reflection coefficient is governed not only by isotropic parameters $$\left( \frac{\Delta\beta^S}{\beta^S}, \frac{\Delta\rho}{\rho} \right)$$

but also by anisotropic parameters ($\Delta\delta^{(v)}$, $\Delta\gamma$, $\Delta\epsilon^{(v)}$). If the seismic amplitudes of PSV modes from orthogonal azimuths are added together, the following is obtained:

$$\begin{aligned} R_{PSV}^{HTI}(\theta, \phi) + R_{PSV}^{HTI}(\theta, \phi + 90) &= \left( 2D_{PSV}^{ISO,S} + \frac{g}{2(g+1)}\Delta\delta^{(v)} - \frac{2}{g}\Delta\gamma \right)\sin\theta + \\ &\quad \left( 2E_{PSV}^{ISO,S} + \frac{1}{4(g+1)}\Delta\delta^{(v)} + \frac{g(2-\sin 2\phi)}{2(g+1)}(\Delta\epsilon^{(v)} - \Delta\delta^{(v)}) + \frac{(g+2)}{g^2}\Delta\gamma \right)\sin^3\theta \\ &\approx \left( 2D_{PSV}^{ISO,F} + \frac{g}{2(g+1)}\Delta\delta^{(v)} + \frac{2}{g}\Delta\gamma \right)\sin\theta + \\ &\quad \left( 2E_{PSV}^{ISO,F} + \frac{1}{4(g+1)}\Delta\delta^{(v)} + \frac{g(2-\sin 2\phi)}{2(g+1)}(\Delta\epsilon^{(v)} - \Delta\delta^{(v)}) - \frac{(g+2)}{g^2}\Delta\gamma \right)\sin^3\theta \end{aligned} \quad (10)$$

In $D_{PSV}^{ISO,F}$ and $E_{PSV}^{ISO,F}$, F signifies fast S-wave based attributes (see equations 3 and 4). The fast S-wave based attributes were utilized in order to allow some of the anisotropic terms to cancel out. Numerical modeling was performed and it was found that the fast S-wave based attributes introduce smaller error into the approximation than slow S-wave based attributes.

In reviewing equation 10, it is first noted that the multiplier of $\sin\theta$ is independent of azimuth angle $\phi$. Moreover, in fractured rocks, $\delta^{(v)}$ is either negative (in dry fractures) or close to zero (in fully-saturated fractures) and $\gamma$ is positive. Hence in equation 10, $$\frac{g}{2(g+1)}\Delta\delta^{(v)} + \frac{2}{g}\Delta\gamma$$

is very small for most practical purposes. Similarly, anisotropic terms in the multiplier of $\sin^3\theta$ are also usually small. As a result, the sum of the reflection coefficients of orthogonal PSV modes can be expected to be independent of azimuth $\phi$.

If the anisotropic coefficients are ignored, equation 10 takes the following form:

$$R_{PSV}^{HTI}(\theta, \phi) + R_{PSV}^{HTI}(\theta, \phi + 90) \approx 2D_{PSV}^{ISO,F}\sin\theta + 2E_{PSV}^{ISO,F}\sin^3\theta \quad (11)$$

where, $$D_{PSV}^{ISO,F} = -\frac{2}{g}\frac{\Delta\beta^F}{\beta^F} - \frac{g+2}{2g}\frac{\Delta\rho}{\rho} = -\frac{2}{g}\frac{\Delta I_s^F}{I_s^F} - \frac{g-2}{2g}\frac{\Delta\rho}{\rho}, \quad (12)$$

$$E_{PSV}^{ISO,F} = \frac{g+2}{g^2}\frac{\Delta\beta^F}{\beta^F} + \frac{2g+3}{4g^2}\frac{\Delta\rho}{\rho} = \frac{g+2}{g^2}\frac{\Delta I_s^F}{I_s^F} - \frac{2g+5}{4g^2}\frac{\Delta\rho}{\rho}. \quad (13)$$

In equations 11, 12 and 13, $\beta^F$, $I_s^F$ and $\rho$ are averages of the fast S-wave velocities, fast S-wave impedances and densities of the media. For example, $\beta^F = (\beta_1^F + \beta_2^F)/2$ where $\beta_1^F$ and $\beta_2^F$ are the fast S-wave velocities of the incident and reflecting media, respectively. $\Delta\beta^F$, $\Delta I_s^F$ and $\Delta\rho$ are the differences of fast S-wave velocities, fast S-wave impedances and densities between the two media. It is important to note that the quantities in equations 11, 12 and 13 are free of anisotropic parameters.

Figure 3A:
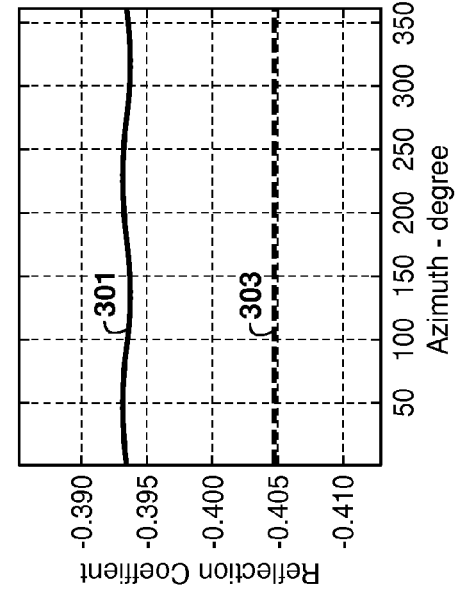
FIGS. 3A-3D depict curves computed by anisotropic and isotropic approximation techniques.
Figure 3B:
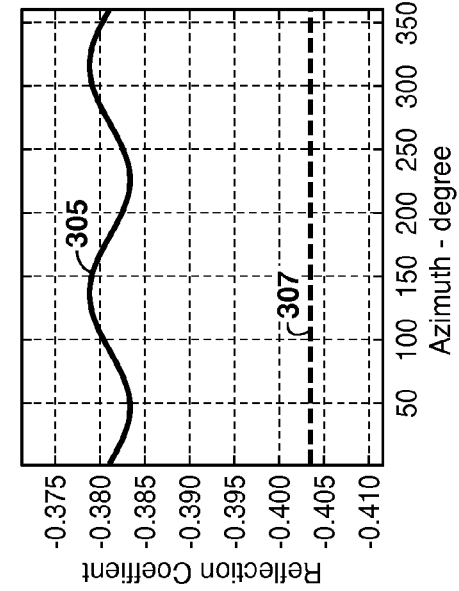
Figure 3C:
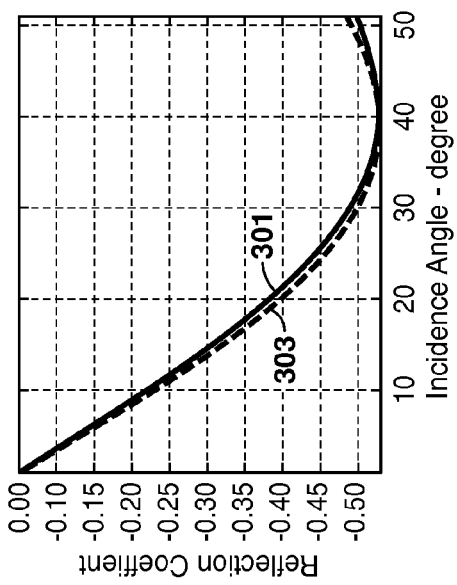
Figure 3D:
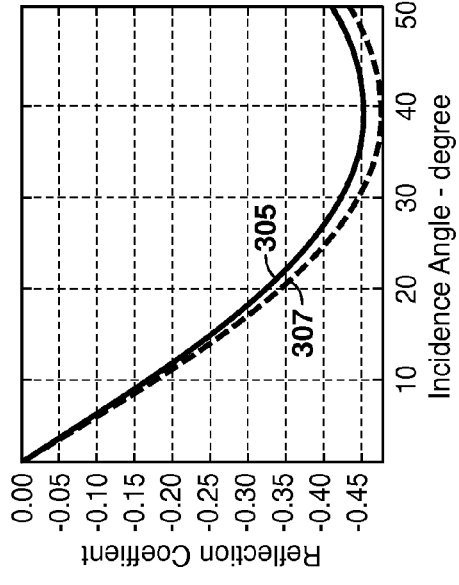

FIGS. 3A-D depict curves computed by anisotropic approximation (equation 10) and isotropic approximation (equation 11). FIGS. 3A and 3B depict the anisotropic approximation (solid line) and the isotropic approximation (dashed line) for dry cracks in sand at various incidence angles and azimuths, respectively. FIGS. 3C and 3D depict the anisotropic approximation (solid line) and the isotropic approximation (dashed line) for fully-saturated cracks in sand at various incidence angles and azimuths, respectively. The following parameters were used to characterize the media. Medium 1 (shale): Vp1=3500 ms; Vs1=1800 ms; ρ1=1.8 g/cc; crack density e1=0.01; dry cracks. Medium 2 (sand): Vp1=4000 ms; Vs1=2500 ms; ρ1=2.3 g/cc; crack density e1=0.06; dry cracks/fully-saturated cracks.

When reviewing these figures, the difference between the two approximations initially appears to be large. However, after considering the error introduced during data acquisition, processing, and generating angle/azimuth stacks, the difference in the AVA pattern is negligible. Moreover, the maximum difference between the two curves occurs when the fractures are fully-saturated with water, which is rarely the case. As a result, the difference between the anisotropic and isotropic approximations is very small and can be ignored for most practical purposes.

In the above discussion, the PSV and PSH modes were determined from $PS_1$ and $PS_2$ mode data. However, fracture parameters may also be estimated by a data rotation scheme first described by Alford [8] for vertical seismic profile (VSP) surveys and later modified by Gaiser [9, 10] for surface seismic survey. This rotations scheme is referred to herein as 4-component (4C) rotation.

The method of 4C rotation performs tensor rotation on the radial and transverse components from orthogonal azimuths. The following equation describes the tensor rotation process:

$$\begin{bmatrix} PS_{11}^\phi & PS_{12}^\phi \\ PS_{21}^\phi & PS_{22}^\phi \end{bmatrix} = \begin{bmatrix} \sin\phi & \cos\phi \\ -\cos\phi & \sin\phi \end{bmatrix} \begin{bmatrix} PS_R^\phi & PS_T^\phi \\ PS_T^{\phi+90} & PS_R^{\phi+90} \end{bmatrix} \begin{bmatrix} \sin\phi & -\cos\phi \\ \cos\phi & \sin\phi \end{bmatrix} \quad (14)$$

In the above equation, $\phi$ is the azimuth of the survey. $PS_R^\phi$ and $PS_T^\phi$ are radial and transverse components, respectively, of the PS mode at survey azimuth $\phi$. $PS_R^{\phi+90}$ and $PS_T^{\phi+90}$ are radial and transverse components from the orthogonal azimuth $\phi+90$. This tensor rotation moves the seismic energy from the off-diagonal components ($PS_T^\phi$ and $PS_T^{\phi+90}$) to diagonal components. The new diagonal components, $PS_{11}$ and $PS_{22}$, carry most of the seismic energy and off-diagonal components, $PS_{12}$ and $PS_{21}$, modes have typically very little energy left. $PS_{11}$ is represents the pseudo-fast mode, while $PS_{22}$ represents the pseudo-slow mode.

After performing the 4C rotation, $PS_{22}$ is aligned with $PS_{11}$ mode by applying a positive time-shift on $PS_{22}$ mode. The new time-aligned $PS_{22}$ mode may be referred to as the time-compensated $PS_{22}$ mode. Alternatively, $PS_{11}$ is aligned with $PS_{22}$ mode by applying a negative time-shift on $PS_{11}$ mode. In either case, the resulting $PS_{11}$ and $PS_{22}$ mode data has been time-adjusted.

After matrix multiplication of equation 14, it can be shown that $PS_{11}$ and time-compensated $PS_{22}$ modes and PSV are related as follow:

$$PS_{11}^\phi + PS_{22}^\phi = PSV^\phi + PSV^{\phi+90} \quad (15)$$

Similar to the $PS_1$ and $PS_2$ modes, the PSV and PSH modes can be thought of as re-computed radial and transverse components if no time-lag existed between $PS_{11}$ and $PS_{22}$ modes. Since the time-lag between $PS_{11}$ and $PS_{22}$ has been removed, PSV and PSH are same as $PS_R$ and $PS_T$, respectively. As a result, equation 15 can be derived from equation 14.

FIG. 4 shows a synthetic example comparing left and right side of equation 15. As depicted, there is an excellent match between the amplitudes of $PS_{11}^\phi + PS_{22}^\phi$ and $PSV^\phi + PSV^{\phi+90}$ at different azimuths.

FIG. 5A illustrates a comparison between RMS amplitudes from the $PS_{11}+PS_{22}$ (solid) gathers and the summed orthogonal PSV gathers (dashed). FIG. 5B charts the percentage difference between the two gathers at every azimuth. As shown, the difference between the two gathers is less than 0.6% for all azimuths. These figures support the conclusion that the reflection amplitude of $PS_{11}^\phi + PS_{22}^\phi$ does not vary with the azimuth and it can be expressed by equation 11.

Figure 6:
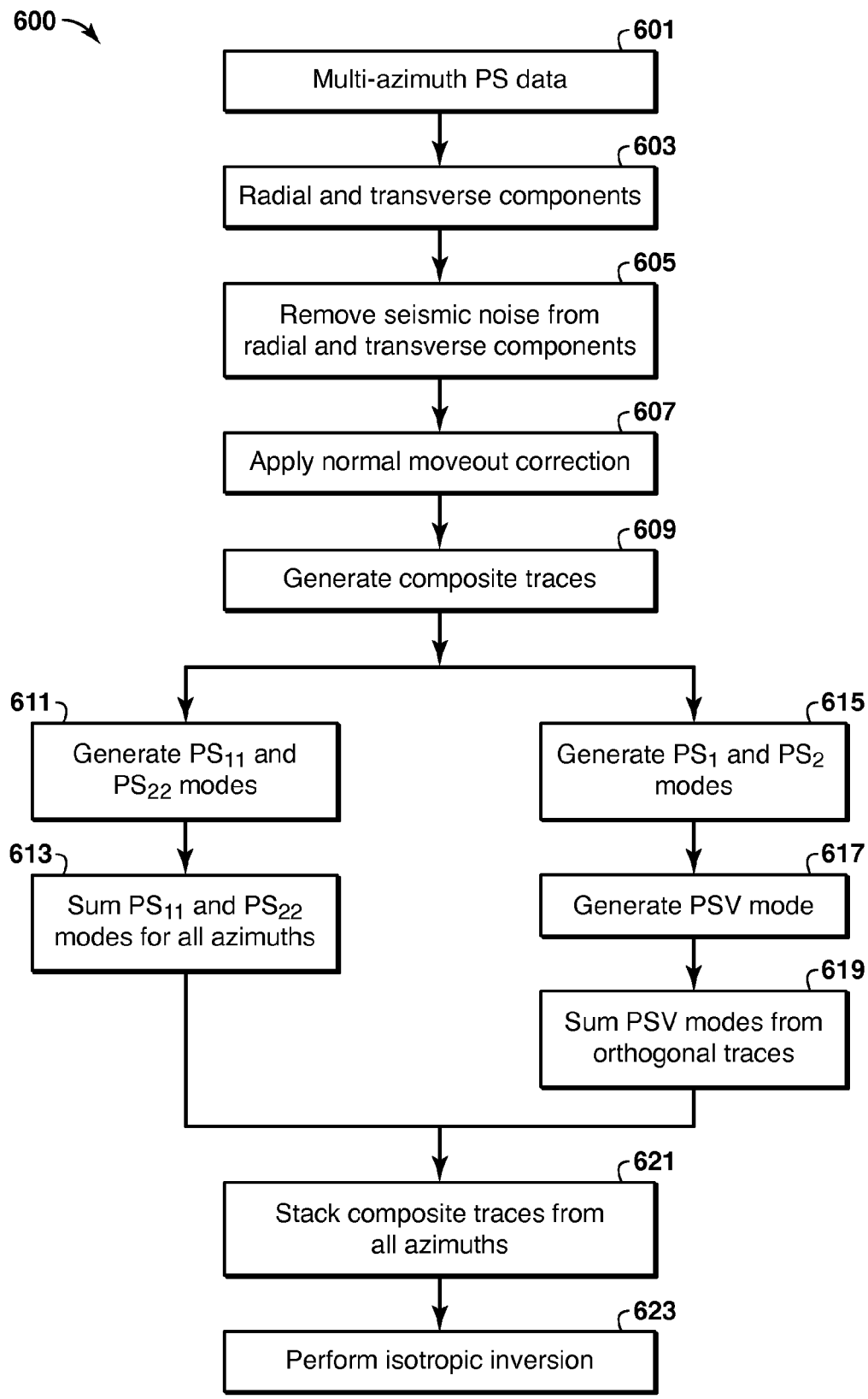
FIG. 6 is a flow chart showing basic steps for the removal of the effects of fracture-induced anisotropy on converted-wave data seismic data according to one embodiment of the present disclosure.

The flowchart of FIG. 6 will be referred to in describing one embodiment of the present disclosure. The depicted process (600) first acquires or receives multi-component, multi-azimuth data from a seismic survey (601). Azimuth is defined for a particular source-receiver combination. The direction (relative to true North or some other reference direction) of the line connecting a source-receiver pair is called the azimuth of that particular source-receiver pair and associated seismic data. Traditionally, only the vertical component of the seismic wavefield, which is dominated by the P-wave energy, is acquired. For certain applications, all three vector components of the wavefield are also acquired (using a motion-detector type of seismic receiver).

In this type of acquisition, any type of P-wave source is used, which may be, but is not limited to, dynamite, a vertical vibrator, or air gun. The vertical component of the data mostly contains P-wave energy and the two horizontal components carry converted-wave PS energy. The PS energy is defined as the P-wave energy reflected back from a reflector as S-wave energy; i.e., P-wave goes down and some of that energy is reflect back up in an S-wave mode.

The process continues as the acquired PS energy is rotated or resolved into radial (direction along the line connecting source to receiver) and transverse (direction perpendicular to the line connecting source to receiver) components (603). Free-surface related seismic noise, such as surface-waves and free-surface multiples, may then be removed from the radial and transverse components (605). After noise correction, normal moveout (NMO) correction is applied (607) on the data to flatten the reflections. In other embodiments, the reflections may be flattened by pre-stack time migration. As appreciated by those skilled in the relevant art, steps 601-607 are standard processing steps and are routinely applied in seismic data processing.

The process continues by generating composite seismic traces at all azimuths whose amplitudes are free of the effects of subsurface anisotropy (step 609). These composite traces may then be further used to estimate subsurface rock properties. The next steps of the illustrated embodiment depend on how the PS energy is processed. In one instance, $PS_{11}$ and time-compensated $PS_{22}$ gathers are generated (step 611). In one embodiment, the $PS_{11}$ and $PS_{22}$ modes are generated by the 4C rotation process described herein. The $PS_{11}$ and time-compensated $PS_{22}$ gathers at common survey azimuths are then summed to create composite traces (step 613).

In another instance, PS1 and time-compensated PS2 gathers are generated (step 615). In one embodiment, the $PS_1$ and $PS_2$ are generated by the 2C rotation process described herein. Next, $PS_1$ and time-compensated $PS_2$ gathers are used to generate PSV traces at all survey azimuths using equation 9 (step 617). PSV traces from orthogonal azimuths are then summed to create composite traces (step 619).

Regardless of how the composite traces are generated, process 600 continues by stacking the composite traces from all azimuths to generate a full-azimuth composite trace (step 621). In other embodiments, the composite traces from some, but not all, azimuths are stacked to generate a multi-azimuth composite trace. Due to stacking of the traces from the different azimuths, the signal-to-noise ratio of the full-azimuth composite trace improves. Because the seismic amplitudes of the composite traces are substantially free of subsurface anisotropy, isotropic inversion is performed on the full-azimuth composite trace (step 623). In one embodiment, subsurface rock properties are inverted for by using the equation 11.

Another embodiment of the present disclosure includes only steps 609 and 623. In additional embodiments, other steps may also be included to meet system and design objectives.

FIGS. 7 and 8 demonstrate application of the disclosed methodology on synthetic radial and transverse data set.

FIGS. 7A-7E demonstrate one embodiment of composite trace generation according to the present disclosure. The synthetic radial and transverse traces are depicted in FIG. 7A. FIG. 7B depicts $PS_{11}$ and $PS_{22}$ traces, which, in some embodiments, are generated using the 4C rotation process. Next, the $PS_{11}$ and $PS_{22}$ traces at each azimuth are summed to generate anisotropy-free composite traces. The summed $PS_{11}$ and $PS_{22}$ traces are illustrated in FIG. 7D.

Also depicted are the seismic amplitudes, in polar plots, of the $PS_{11}$ and $PS_{22}$ traces (FIG. 7C) and the generated anisotropy-free composite traces (FIG. 7E). FIG. 7C demonstrates that the seismic amplitudes of $PS_{11}$ (solid) and $PS_{22}$ (dashed) vary with azimuth. However, as seen in FIG. 7E, the seismic amplitudes of $PS_{11}+PS_{22}$ traces do not vary with azimuth, thereby demonstrating that the composite traces are free of the effects of subsurface anisotropy. Based on equation 11:

$$PS^{HTI}_{PS_{11}+PS_{22}} \approx 2R^{ISO,F}_{PS} = \qquad (16)$$
$$2\left(-\frac{2}{g}\frac{\Delta\beta^F}{\beta^F} - \frac{g+2}{2g}\frac{\Delta\rho}{\rho}\right)\sin\theta + 2\left(\frac{g+2}{g^2}\frac{\Delta\beta^F}{\beta^F} + \frac{2g+3}{4g^2}\frac{\Delta\rho}{\rho}\right)\sin^3\theta =$$
$$2\left(-\frac{2}{g}\frac{\Delta I^F_s}{I^F_s} - \frac{g-2}{2g}\frac{\Delta\rho}{\rho}\right)\sin\theta + 2\left(\frac{g+2}{g^2}\frac{\Delta I^F_s}{I^F_s} - \frac{2g+5}{4g^2}\frac{\Delta\rho}{\rho}\right)\sin^3\theta$$

Equation 16 allows subsurface rock properties to be calculated based upon known isotropic inversion techniques.

FIGS. 8A-8G demonstrate another embodiment of composite trace generation according to the present disclosure. Synthetic radial and transverse traces are also depicted in FIG. 8A. FIG. 8B depicts $PS_1$ and $PS_2$ traces, which, in some embodiments, are generated using the 2C rotation process. Next, PSV traces are derived from the $PS_1$ and $PS_2$ traces. These PSV traces are illustrated in FIG. 8D. PSV traces from orthogonal azimuths are then summed to generate anisotropy-free composite traces. The $PSV+PSV^{90}$ traces are illustrated in FIG. 8F.

Also depicted are the seismic amplitudes, in polar plots, of the $PS_1$ and $PS_2$ traces (FIG. 8C), the PSV traces (FIG. 8E), and the generated anisotropy-free composite traces (FIG. 8F). FIG. 8C demonstrates that the seismic amplitudes of $PS_1$ (solid) and $PS_2$ (dashed) vary with azimuth. FIG. 8E also demonstrates that the seismic amplitude of the PSV traces also vary with azimuth. However, as seen in FIG. 8G, the seismic amplitudes of composite traces ($PSV+PSV^{90}$) do not vary with azimuth, thereby demonstrating that the composite traces are free of the effects of subsurface anisotropy. Based on equation 11:

$$PS^{HTI}_{PSV+PSV^{90}} \approx 2R^{ISO,F}_{PS} \qquad (17)$$
$$= 2\left(-\frac{2}{g}\frac{\Delta\beta^F}{\beta^F} - \frac{g+2}{2g}\frac{\Delta\rho}{\rho}\right)\sin\theta +$$
$$2\left(\frac{g+2}{g^2}\frac{\Delta\beta^F}{\beta^F} + \frac{2g+3}{4g^2}\frac{\Delta\rho}{\rho}\right)\sin^3\theta$$
$$2\left(-\frac{2}{g}\frac{\Delta I^F_s}{I^F_s} - \frac{g-2}{2g}\frac{\Delta\rho}{\rho}\right)\sin\theta + 2\left(\frac{g+2}{g^2}\frac{\Delta I^F_s}{I^F_s} - \frac{2g+5}{4g^2}\frac{\Delta\rho}{\rho}\right)\sin^3\theta$$

Equation 17 allows subsurface rock properties to be calculated based upon isotropic inversion techniques.

Subsurface rock properties can be solved in a variety of ways. In one embodiment, forwarding modeling is performed using equation 16 or 17 and using a set of rock properties $$\left(\frac{\Delta\beta^F}{\beta^F} \text{ or } \frac{\Delta I^F_s}{I^F_s} \text{ and } \frac{\Delta\rho}{\rho}\right).$$

The modeled synthetic traces are compared with the field data, i.e., the generated composite traces. If there is a good match between the two, it is assumed that the correct rock properties were used to do the modeling. If there is not a good match, then modeling is performed again using a new set of rock properties. This process is iterated until there is a good match between the synthetics and the composite traces. The final rock properties used to do the modeling is assumed to be the correct subsurface properties.

Another way to estimate the rock properties are by directly inverting for them from the seismic data. In such approach, a least-squares inverse problem is set up using equation 16 or 17. The seismic data (or, in the case of the present invention, composite traces) at multiple incidence angles is used as the input to the inverse problem. The least-squares inverse problem is then solved to estimate at least one rock property at each time sample.

While the invention has been illustrated and described in detail in the drawings and foregoing description, the same is to be considered as illustrative and not restrictive in character, it being understood that only the preferred embodiments have been shown and described and that all changes and modifications that come within the wording of the claims are desired to be protected. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

REFERENCES

1. Aki, K., and Richards, P. G., *Quantitative seismology: Theory and methods*, v. 1: W. H. Freeman and Co., 148 (2002).
2. Ruger, A. and Tsvankin, I., "Using AVO for fracture detection: Analytic basis and practical solutions," *The Leading Edge* 16, 1429-1434 (1997).
3. Thomsen, L, "Weak elastic anisotropy," *Geophysics* 51, 1954-1966 (1986).

4. Jilek, P., "Modeling and inversion of converted-wave reflection coefficients in anisotropic media: A tool for quantitative AVO analysis," PhD dissertation, Colorado School of Mines (2001).

5. Khare, V., Jenkinson, T., Martinez, A., Matheney, M., and Bansal, R., "Registration of PP and PS data using joint AVA attributes," 71st EAGE Conference (2009).

6. Tsvankin, I., "Reflection moveout and parameter estimation for horizontal transverse anisotropy," *Geophysics* 62, 614-629 (1997).

7. Bansal, R., Matheney M. and Liu, E., "True amplitude Layer-stripping in fractured media," U.S. Patent Application No. 61/484,949.

8. Alford, R. M., "Multisource multireceiver method and system for geophysical exploration," U.S. Pat. No. 5,343,441 (1994).

9. Gaiser, J. E., "3-D converted shear wave rotation with layer stripping," U.S. Pat. No. 5,610,875 (1997).

10. Gaiser, J. E., "Application for vector coordinate systems of 3-D converted-wave data," *The Leading Edge* 18, 1290-1300 (1999).

What is claimed is:

1. A method for inferring one or more physical property parameters of a subsurface media by inverting converted wave data acquired during a seismic survey, comprising:

generating a composite seismic trace at a plurality of survey azimuths, said composite traces being composed such that their amplitudes are free of effects of subsurface anisotropy; and inverting at least one composite seismic trace by isotropic inversion to determine a property parameter of the subsurface media.

2. The method of claim 1 further comprising stacking the composite traces at all survey azimuths to generate a full-azimuth stack and inverting said full-azimuth stack by isotropic inversion.

3. The method of claim 1 further comprising stacking the composite traces at a plurality of survey azimuths to generate a multi-azimuth stack and inverting said multi-azimuth stack by isotropic inversion.

4. The method of claim 1, wherein each composite trace is a sum of time-adjusted $PS_{11}$ mode data and $PS_{22}$ mode data from orthogonal azimuths, the $PS_{11}$ and $PS_{22}$ mode data is generated by performing a tensor rotation on the radial and transverse components of the S-wave data, the $PS_{11}$ mode data and $PS_{22}$ mode data is time-adjusted by applying either a positive time-shift on the $PS_{22}$ mode data or a negative time-shift on the $PS_{11}$ mode data.

5. The method of claim 4, wherein the tensor rotation process utilizes an equation that can be expressed as $$\begin{bmatrix} PS_{11}^\phi & PS_{12}^\phi \\ PS_{21}^\phi & PS_{22}^\phi \end{bmatrix} = \begin{bmatrix} \sin\phi & \cos\phi \\ -\cos\phi & \sin\phi \end{bmatrix} \begin{bmatrix} PS_R^\phi & PS_T^\phi \\ PS_T^{\phi+90} & PS_R^{\phi+90} \end{bmatrix} \begin{bmatrix} \sin\phi & -\cos\phi \\ \cos\phi & \sin\phi \end{bmatrix}$$

where $\phi$ is the azimuth of the survey, $PS_R^\phi$ and $PS_T^\phi$ are the radial and transverse components of the converted wave seismic data at survey azimuth $\phi$, and $PS_R^{\phi+90}$ and $PS_T^{\phi+90}$ are radial and transverse components from the orthogonal azimuth $\phi+90$.

6. The method of claim 4, wherein the inversion process utilizes a formula that can be expressed as $$PS_{PS_{11}+PS_{22}}^{HTI} \approx 2R_{PS}^{ISO,F} = 2\left(-\frac{2}{g}\frac{\Delta\beta^F}{\beta^F} - \frac{g+2}{2g}\frac{\Delta\rho}{\rho}\right)\sin\theta + \frac{2\left(\frac{g+2}{g^2}\frac{\Delta\beta^F}{\beta^F} + \frac{2g+3}{4g^2}\frac{\Delta\rho}{\rho}\right)\sin^3\theta}{2\left(-\frac{2}{g}\frac{\Delta I_s^F}{I_s^F} - \frac{g-2}{2g}\frac{\Delta\rho}{\rho}\right)\sin\theta + 2\left(\frac{g+2}{g^2}\frac{\Delta I_s^F}{I_s^F} - \frac{2g+5}{4g^2}\frac{\Delta\rho}{\rho}\right)\sin^3\theta}$$

$$\begin{aligned}PS_{PS_{11}+PS_{22}}^{HTI} &\approx 2R_{PS}^{ISO,F}\\ &= 2\left(-\frac{2}{g}\frac{\Delta\beta^F}{\beta^F} - \frac{g+2}{2g}\frac{\Delta\rho}{\rho}\right)\sin\theta + \\ &\quad 2\left(\frac{g+2}{g^2}\frac{\Delta\beta^F}{\beta^F} + \frac{2g+3}{4g^2}\frac{\Delta\rho}{\rho}\right)\sin^3\theta\\ &= 2\left(-\frac{2}{g}\frac{\Delta I_s^F}{I_s^F} - \frac{g-2}{2g}\frac{\Delta\rho}{\rho}\right)\sin\theta + \\ &\quad 2\left(\frac{g+2}{g^2}\frac{\Delta I_s^F}{I_s^F} - \frac{2g+5}{4g^2}\frac{\Delta\rho}{\rho}\right)\sin^3\theta\end{aligned}$$

where $\beta^F$ is the average fast S-wave velocity of an incident media and reflecting media at an interface, $I_s^F$ is the average fast S-wave impedance of the incident and reflecting media, $\rho$ is the average density of the incident and reflecting media, $\Delta\beta^F$ is the difference in fast S-wave velocity between the incident and reflecting media, $\Delta I_s^F$ is the difference in fast S-wave impedance between the incident and reflecting media, $\Delta\rho$ is the difference in density between the incident and reflecting media.

7. The method of claim 6, wherein the property parameter is $$\frac{\Delta\beta^F}{\beta^F} \text{ or } \frac{\Delta I_s^F}{I_s^F} \text{ or } \frac{\Delta\rho}{\rho}.$$

8. The method of claim 6, wherein the property parameter is $\Delta\beta^F$ or $\Delta I_s^F$ or $\Delta\rho$.

9. The method of claim 1, wherein each composite trace is a sum of PSV modes from orthogonal traces, said PSV modes being obtained from a two-component rotation of radial and transverse components of the converted wave data.

10. The method of claim 9, wherein the inversion process utilizes a formula that can be expressed as $$PS_{PS_{11}+PS_{22}}^{HTI} \approx 2R_{PS}^{ISO,F} = 2\left(-\frac{2}{g}\frac{\Delta\beta^F}{\beta^F} - \frac{g+2}{2g}\frac{\Delta\rho}{\rho}\right)\sin\theta + \frac{2\left(\frac{g+2}{g^2}\frac{\Delta\beta^F}{\beta^F} + \frac{2g+3}{4g^2}\frac{\Delta\rho}{\rho}\right)\sin^3\theta}{2\left(-\frac{2}{g}\frac{\Delta I_s^F}{I_s^F} - \frac{g-2}{2g}\frac{\Delta\rho}{\rho}\right)\sin\theta + 2\left(\frac{g+2}{g^2}\frac{\Delta I_s^F}{I_s^F} - \frac{2g+5}{4g^2}\frac{\Delta\rho}{\rho}\right)\sin^3\theta}$$

-continued $$PS^{HTI}_{PS_{11}+PS_{22}} \approx 2R^{ISO,F}_{PS}$$

$$= 2\left(-\frac{2}{g}\frac{\Delta\beta^F}{\beta^F} - \frac{g+2}{2g}\frac{\Delta\rho}{\rho}\right)\sin\theta +$$

$$2\left(\frac{g+2}{g^2}\frac{\Delta\beta^F}{\beta^F} + \frac{2g+3}{4g^2}\frac{\Delta\rho}{\rho}\right)\sin^3\theta$$

$$= 2\left(-\frac{2}{g}\frac{\Delta I^F_s}{I^F_s} - \frac{g-2}{2g}\frac{\Delta\rho}{\rho}\right)\sin\theta +$$

$$2\left(\frac{g+2}{g^2}\frac{\Delta I^F_s}{I^F_s} - \frac{2g+5}{4g^2}\frac{\Delta\rho}{\rho}\right)\sin^3\theta$$

where $\beta^F$ is the average fast S-wave velocity of an incident media and reflecting media at an interface, $I^F_s$ is the average fast S-wave impedance of the incident and reflecting media, $\rho$ is the average density of the incident and reflecting media, $\Delta\beta^F$ is the difference in fast S-wave velocity between the incident and reflecting media, $\Delta I^F_s$ is the difference in fast S-wave impedance between the incident and reflecting media, $\Delta\rho$ is the difference in density between the incident and reflecting media.

11. The method of claim 10, wherein the property parameter is $$\frac{\Delta\beta^F}{\beta^F} \text{ or } \frac{\Delta I^F_s}{I^F_s} \text{ or } \frac{\Delta\rho}{\rho}.$$

12. The method of claim 10, wherein the property parameter is $\Delta\beta^F$ or $\Delta I_s^F$ or $\Delta\rho$.

13. The method of claim 9, wherein the two-component rotation generates $PS_1$ mode data and $PS_2$ mode data, the $PS_1$ mode data and $PS_2$ mode data is then time adjusted by applying either a positive time-shift on the $PS_2$ mode data or a negative time-shift on the $PS_1$ mode data.

14. The method of claim 13, wherein the two-component rotation utilizes an equation that can be expressed as $$\begin{bmatrix} PSV \\ PSH \end{bmatrix} = \begin{bmatrix} \sin\phi & \cos\phi \\ -\cos\phi & \sin\phi \end{bmatrix} \begin{bmatrix} PS_1 \\ PS_2 \end{bmatrix}$$

where $\phi$ is the azimuth of the survey with respect to the fractures normal.

15. The method of claim 1, wherein the isotropic inversion is performed on a computer.

16. A method for producing hydrocarbons from a subsurface formation comprising:
   obtaining seismic data from a multi-component seismic survey of the subsurface formation;
   processing the seismic data using a method of claim 1 to determine at least one subsurface rock property estimate;
   drilling a well into the subsurface formation based at least in part on the rock property estimate; and
   producing hydrocarbons from the well.

\* \* \* \* \*